(12) United States Patent
Artonne et al.

(10) Patent No.: US 6,885,817 B2
(45) Date of Patent: Apr. 26, 2005

(54) METHOD AND DEVICE FOR ORIENTING A DIGITAL PANORAMIC IMAGE

(75) Inventors: Jean-Claude Artonne, Montreal (CA); Christophe Moustier, Marseille (FR)

(73) Assignee: 6115187 Canada Inc., Saint-Laurent (CA)

(*) Notice: Subject to any disclaimer, the term of this patent is extended or adjusted under 35 U.S.C. 154(b) by 0 days.

(21) Appl. No.: 10/641,573

(22) Filed: Aug. 14, 2003

(65) Prior Publication Data

US 2004/0086271 A1 May 6, 2004

Related U.S. Application Data

(63) Continuation of application No. PCT/FR02/00539, filed on Feb. 13, 2002.

(30) Foreign Application Priority Data

Feb. 16, 2001 (FR) .............................. 01 02147

(51) Int. Cl.[7] .............................................. G03B 37/00
(52) U.S. Cl. .................... 396/20; 396/281; 396/315; 396/419; 396/428; 348/36; 348/373; 248/542; 248/187.1
(58) Field of Search .......................... 396/20, 281, 315, 396/419, 428; 348/36–39, 373; 248/542, 543, 187.1

(56) References Cited

U.S. PATENT DOCUMENTS 1,282,177 A 10/1918 Blankenhorn
3,183,810 A 6/1962 Campbell et al.
5,051,776 A 9/1991 Mancino
5,203,871 A * 4/1993 Seo .............................. 248/542
5,259,584 A * 11/1993 Wainwright ................ 248/542
5,270,545 A 12/1993 Phillips et al.
5,563,650 A 10/1996 Poelstra
5,752,113 A 5/1998 Borden
5,870,642 A 2/1999 Mittelstaedt et al.
6,019,326 A 2/2000 Baerwolf et al.
6,714,249 B1 * 3/2004 May et al. ................... 348/373
2004/0086270 A1 5/2004 Artonne et al.
2004/0109078 A1 6/2004 Artonne et al.

FOREIGN PATENT DOCUMENTS

| DE | 199 06 375 C1 | 7/2000 |
|---|---|---|
| EP | 0 674 429 A2 | 9/1995 |
| JP | 60111578 | 6/1985 |
| JP | 5-281633 A | 10/1993 |
| JP | 7-306486 A | 11/1995 |
| SU | 1075220 A | 2/1984 |
| WO | WO 98/27457 A1 | 6/1998 |
| WO | WO 99/46928 A1 | 9/1999 |
| WO | WO 00/04492 A2 | 1/2000 |
| WO | WO 00/58787 A1 | 10/2000 |

* cited by examiner

*Primary Examiner*—W. B. Perkey
(74) *Attorney, Agent, or Firm*—Akin Gump Strauss Hauer & Feld, LLP

(57) ABSTRACT

A method for orienting a digital panoramic image obtained using at least one initial wide-angle image the image points of which are transferred into a three-dimensional coordinate system includes inserting an orientation mark into the initial image at the time of the exposure. The method further includes detecting the location of the orientation mark in the digital panoramic image, performed by an image analysis algorithm.

15 Claims, 11 Drawing Sheets

FIG. 9

| S1 – Acquisition |
|---|
| - Panoramic photograph N°1 (183° x 183°): loading the image points delivered by the LCD cell into the Flash memory of the camera (photo file N°1)<br>- Rotation of the camera by 180° in the nodal plane of the lens<br>- Panoramic photograph N°2 (183° x 183°): loading the image points delivered into the Flash memory of the camera (photo file N°2) |

| S2 – Digitisation |
|---|
| - Transfer of the photo files into a microcomputer<br>- Storage in the secondary memory (optional)<br>- Transfer of the image points of the first photograph into a system of axes Oxyz in spherical coordinates → a first hemisphere image is obtained<br>- Transfer of the image points of the first photograph into the spherical coordinate system → a second hemisphere image is obtained |

| S3 – Forming a panoramic image |
|---|
| - Assembly of the two hemisphere images → a spherical panoramic image is obtained (image points coded RGBA($\varphi,\theta$) in the mark Oxyz)<br>- Creation of one or more links with one or more other panoramic images with a view to a virtual visit |

| S4 – Orientation of the panoramic image |
|---|
| - Search for the orientation mark (such as compass needle or tongue for example)<br>- Determination of the angle $\theta_N$ between the axis Ox and the tongue or the North<br>- Logging of $\theta_N$ or readjusting the axis Ox on the orientation mark |

| S5 – Colour correction |
|---|
| - Reading the primary colours in the colour-grading zone<br>- Calculation of the mean value r, g, b of each primary colour of the colour-grading zone<br>- Calculation of the gamma $\gamma r, \gamma g, \gamma b$ of each primary colour of the grading zone<br>- Gamma correction applied to all the points of the image |

METHOD AND DEVICE FOR ORIENTING A DIGITAL PANORAMIC IMAGE

CROSS-REFERENCE TO RELATED APPLICATIONS

This application is a continuation of International Application No. PCT/FR02/00539, filed Feb. 13, 2002, and the disclosure of which is incorporated herein by reference.

BACKGROUND OF THE INVENTION

The present invention relates to digital photography and particularly to taking wide-angle photographs, as well as transforming wide-angle photographs into digital panoramic images.

The present invention also relates to presenting digital panoramic images on a screen and virtual visits of places by means of panoramic images.

In recent years, the fast progress of micro-computing and manufacturing techniques of digital cameras have led to a substantial development in digital photography and the access thereto by the public.

Among the various applications offered by digital photography, the presentation of 360° panoramic images on computer screens has undergone a considerable boom as it is possible with this technique to produce virtual visits of places using a simple computer screen with a reduced viewing angle, the observer being able, by means of the screen pointer, to drag the image presented on the screen to the left, the right, upwards or downwards, up to the limits of the panoramic image. These panoramic images have generally a spherical or cylindrical appearance, such that the observer can at least go completely round the image in the horizontal plane and come back to the starting point. Furthermore, with spherical images it is possible to go completely around the image in the vertical plane. Moreover, by providing hyper-anchor type links between two panoramic images the observer can change from one image to another by a simple "click" on the mouse in an active zone present in the image. The active zone generally corresponds to an object present on the image, such as a door or a window for example.

Various examples of panoramic images and virtual visits are presented on many Web sites. In particular, reference is made to the site "http://www.panoguide.com" ("the guide to panoramas and panoramic photography") that gives exhaustive insight into all the products available to the public, from photography equipment to software used to form 360° panoramic images by assembling wide-angle photographs, to correct the color of images, to produce active zones producing chains of panoramic images. These software programs, that implement mathematical algorithms for digital image processing, are offered to the public in the form of programs downloadable on the Internet or on CD-ROMs available in stores.

To date, despite increasing access to the public and the general craze for them, these techniques for obtaining digital panoramic images and virtual visits have several disadvantages that will be explained below.

Disadvantages of the Photography Equipment

It must be specified here that obtaining a 360° digital panoramic image generally requires taking at least two 180° photographs (or N photographs taken with an angle of 360°/N) by means of a panoramic lens and a pan head, as 360° lenses are expensive and have a small camera angle in the vertical plane. Such a pan head comprises one rotatably mounted part that receives the camera and that comprises means for adjusting the position of the camera, after several adjustments of which, the nodal plane of the lens can be aligned with the axis of rotation of the pan head, which is essential to avoid parallax errors. Yet, this alignment is not easy to obtain and requires several adjustments and tests. Furthermore, the pan heads are precision instruments that are quite considerable in price.

Furthermore, SLR ("Single Lens Reflex") type digital cameras can receive any type of lens but they are expensive and not very accessible to the general public, which generally turns towards compact digital cameras, i.e. with a fixed lens. To overcome the disadvantage created by the irremovability of the lens of compact cameras, certain manufacturers offer lenses called adapters ("conversion lenses") which include panoramic adapter lenses ("fisheye conversion lenses" or "fisheye converters") and telephoto lens-type adapters ("tele-converter lenses"). These adapter lenses can be screwed directly onto the fixed lens of the compact camera, the back lens of the adapter lens thus being opposite the front lens of the fixed lens, and enable the owner of a compact camera to take wide-angle photographs. Unfortunately, these adapters are not universal and many compact cameras cannot receive them as they do not have the required thread.

Disadvantages of the Differences in Color between Panoramic Images

Another disadvantage of the above-mentioned techniques relates to the correction of the colors of the panoramic images obtained by assembling wide-angle photographs.

It must be specified here that after taking at least two digital wide-angle photographs, the photographic files delivered by the image sensor of the camera must be transferred into a microcomputer equipped with software executing image conversion algorithms. These algorithms transfer the image points of each photograph into a three-dimensional coordinate system, of the spherical, cubic, cylindrical, polyhedral type, etc. After the transfer, there are two semi-panoramic images, such as two images in hemispheres for example, that are assembled to obtain a total panoramic image, i.e., of 360°.

Disadvantages of the Orientation of Panoramic Images in a Virtual Visit

Another problem of the above-mentioned techniques, occurring in a virtual visit, is that the observer is subject to a phenomenon of disorientation during a transition from one panoramic image to the other, as he has no common point of reference between the different panoramas. This phenomenon is particularly noticeable in a virtual visit of a place comprising several adjoining rooms each represented by one or more panoramic images. For example, three adjoining rooms will be considered that each comprise a door to each of the other two rooms, and three panoramic images respectively representing each room and each comprising two active zones defined in the regions corresponding to the doors. The problem is to define the portion of panoramic image to be displayed on the screen when the observer enters a panoramic image.

BRIEF SUMMARY OF THE INVENTION

Briefly stated, the present invention comprises a method and a camera support device for taking a wide-angle photograph by means of a compact digital camera, including a compact camera that does not comprise means for attaching a panoramic adapter lens.

The present invention also comprises a method and a device that facilitate the taking of wide-angle photographs without parallax errors, without the need to make the usual and delicate adjustments of the position of the camera to obtain the correct alignment between the axis of rotation of the camera and the nodal plane of the front lens of the panoramic lens.

The present invention also comprises a camera support device that is simple in structure and with a low cost price.

Although digital cameras perform white balances and a correction of the luminosity (gamma correction), the exposure conditions differ depending on whether one is facing or turning one's back to the sun and, for photographs taken inside, according to the sources of light present (neon lights, windows, etc.). As a result, each semi-panoramic image has a specific dominant color, which appears clearly in the final panoramic image, for example in the form of a sudden variation in color between the first and the second hemisphere in the case of a spherical panoramic image.

A classical solution to this problem involves readjusting the colors of a hemisphere with reference to the other hemisphere. This readjustment comprises a step of determining the gamma of the primary colors of the first hemisphere in the areas where it joins or overlaps with the second hemisphere, performed with reference to the intensity of the primary colors of the points of the second hemisphere. The following step involves applying a gamma correction to all the points of the first hemisphere. Thus a constant, dominant color is obtained over the entire panoramic image.

Unfortunately, this color correction only has a relative value and the problem of the difference in colors reappears when two panoramic images are compared. Each image has a general color which, although it is homogeneous thanks to the above-mentioned method, is different from that of the next image. This problem appears clearly when several panoramic images are chained in a virtual visit of a place, and results in substantial variations in color when the observer switches from one panoramic image to another.

Thus, of the present invention also comprises a means and a method for correcting color to homogenize the color of several digital panoramic images.

One known solution to the problem of disorientation phenomenon during transitions involves defining a default angle of orientation that is constant whatever the point of entry into the panoramic image. Using the example mentioned above again, that means that the portion of room presented on the screen is constant regardless of the door used to enter. It is therefore obvious that this solution has the disadvantage of disorienting the observer.

Another known solution to the problem of distortion phenomenon during transitions involves defining several default angles of orientation, chosen dynamically according to the point of entry into the panoramic image, i.e., according to the active zone selected in the previous panoramic image. This solution has the disadvantage of being complex to implement. It requires developing a map of the place and determining an angle of orientation for each hyper-anchor link provided between two images.

Thus, the present invention also comprises a means and a method for orienting a digital panoramic image.

In yet another aspect, the present invention also comprises a method for displaying a digital panoramic image in which the orientation of the image is determined dynamically without the need to chain the different panoramic images.

The present invention also includes a support device for camera, comprising means for attaching a camera and means for rotating around an axis, characterised in that it comprises an orientation means arranged so that it appears in an exposure when a camera fitted with a panoramic lens is attached to the support device.

According to one embodiment, the device comprises a compass having a round-shaped face arranged concentrically to the axis of rotation of the support device.

According to one embodiment, the device comprises a compass comprising a face of an artificial color designed to be distinguished from the natural colors of an exposure during a computer image analysis aiming to find the location of the compass.

According to one embodiment, the compass comprises an orientation mark of a determined color that contrasts highly with the color of the face, so as to be distinguished from the face during a computer image analysis aiming to find the location of the orientation mark.

According to one embodiment, the orientation mark is a needle comprising a color that contrasts highly with the color of the face on a first north or south half and a color substantially identical to the color of the face on a second south or north half.

According to one embodiment, the compass has a centre part in a dark color such that the face of the compass forms a colored ring the shape of which facilitates the detection of the face during a computer image analysis aiming to find the location of the face.

According to one embodiment, the device comprises a means for locating an arbitrary orientation, the position of which can be adjusted manually, and means for attaching the locating means arranged so that the locating means can be arranged in a visible position where it appears in an exposure when a panoramic lens is combined with the camera.

According to one embodiment, the locating means is a tongue that extends over a compass face and is of a color that contrasts highly with the color of the face so as to facilitate the detection of the tongue during a computer image analysis aiming to find the location of the locating means.

According to one embodiment, the locating means is rotatably mounted around an axis coaxial to the axis of rotation of the support device.

According to one embodiment, the device comprises a color-grading component comprising at least three primary colors, and means for attaching the color-grading component arranged so that the color-grading component appears in an exposure when a camera fitted with a panoramic lens is arranged on the support device.

According to one embodiment, the color-grading component is circular and concentric to the axis of rotation of the device.

According to one embodiment, the device comprises means for attaching a camera fitted or capable of being fitted with a first lens, and means for attaching an adapter lens, particularly a panoramic adapter lens, arranged to hold the adapter lens in line with the first lens without the need to attach the adapter lens to the camera.

According to one embodiment, the means for attaching the adapter lens comprise a mobile component and means for attaching the adapter lens to the mobile component. The mobile component is slidably mounted and pushed by an elastic means in a direction corresponding to the location of the front lens of the first lens.

According to one embodiment, the device comprises an optical guide to take a front light to a light-sensitive cell of the camera.

According to one embodiment, the means for attaching the adapter lens are arranged to hold the adapter lens in a position such that the axis of rotation of the support device is located substantially in the nodal plane of the front lens of the adapter lens.

The present invention also relates to a method for orienting a digital panoramic image obtained by transferring the image points of at least one initial image into a three-dimensional coordinate system. The method includes inserting an orientation mark into the initial image at the time of the exposure, and a step of detecting the location of the orientation mark in the digital panoramic image, performed by means of an image analysis algorithm.

According to one embodiment, the inscription of an orientation mark on the initial image comprises the fact of arranging a compass in the shooting field of a panoramic lens, so that the compass appears on the initial image.

According to one embodiment, the step of detecting the location of the orientation mark in the digital panoramic image comprises searching for the location of the face of the compass.

According to one embodiment, the step of detecting the orientation mark in the digital panoramic image comprises a step of searching for the location of a needle in a face zone.

According to one embodiment, the image points of the initial image are transferred into a spherical coordinate system to form a spherical panoramic image, the face of the compass fills a sphere sector in the spherical panoramic image, and the step of searching for the location of the face in the spherical panoramic image comprises angularly scanning the sphere along a line that is oblique or perpendicular to the sphere sector.

According to one embodiment, the inscription of an orientation mark on the initial image comprises disposing a colored tongue in the shooting field of a panoramic lens, so that the tongue appears on the initial image.

According to one embodiment, the tongue is arranged above a zone of artificial color designed to be distinguished from the natural colors of an exposure. The step of searching for the orientation mark in the image comprises searching for the location of the zone of artificial color and detecting a tongue color in the zone of artificial color.

According to one embodiment, the zone of artificial color on which the tongue is arranged is the face of a compass. The step of searching for the orientation mark in the image comprises searching for the tongue in the colored zone of the face and, if the tongue is not found, a step of searching for a needle of the compass.

According to one embodiment, the initial image is a photograph.

According to one embodiment, the initial image is delivered by a video camera.

The present invention also relates to a method for interactively displaying on a screen a digital panoramic image obtained by transferring the image points of at least one initial image into a three-dimensional coordinate system. The method comprises displaying an initial image sector on the screen and dragging the image sector displayed according to an interactivity signal. The method also comprises a preliminary step of orienting the panoramic image produced in accordance with the orienting method described above, the initial image sector displayed on the screen being determined with reference to the orientation mark detected.

According to one embodiment, the initial image sector displayed on the screen is a sector of the panoramic image comprising a set of points the coordinates in the three-dimensional coordinate system of which have an angle comprised between a low limit and a high limit in relation to a reference angle that varies according to the orientation mark detected.

According to one embodiment, the initial image sector displayed on the screen is determined so that at least one image point of the initial image sector has, in relation to the orientation mark, an angle equal to a reference angle determined according to the orientation mark detected.

According to one embodiment, the image point having an angle equal to a reference angle in relation to the orientation mark is displayed in the center of the screen.

According to one embodiment, the reference angle is determined during a step of displaying a previous panoramic image, when a user activates a zone for selecting a next panoramic image in the previous panoramic image, by calculating the angle that the selection zone has in relation to the orientation mark.

According to one embodiment, the reference angle is chosen equal to the angle that the selection zone has in relation to the orientation mark.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 9 is a flowchart describing steps of obtaining a digital panoramic image, of orienting the panoramic image and of correcting the color of the digital panoramic image, FIGS. 10A and 10B schematically represent a spherical-type digital panoramic image and respectively show one step of the image orienting method according to the present invention and one step of the color correcting method according to the present invention, FIGS. 11A and 11B schematically represent an enclosed place and show a method according to the present invention of displaying panoramic images.

DETAILED DESCRIPTION OF THE INVENTION

I. Description of a Camera Support Device According to the Present Invention a. Principal Aspects of the Support Device

FIGS. 1 to 4 respectively represent by a cross-section, a top view, a front view and a perspective view one example of embodiment of a device 20 according to the present invention, intended to be used as a support for a compact camera and represented here with such a camera.

Figure 1:
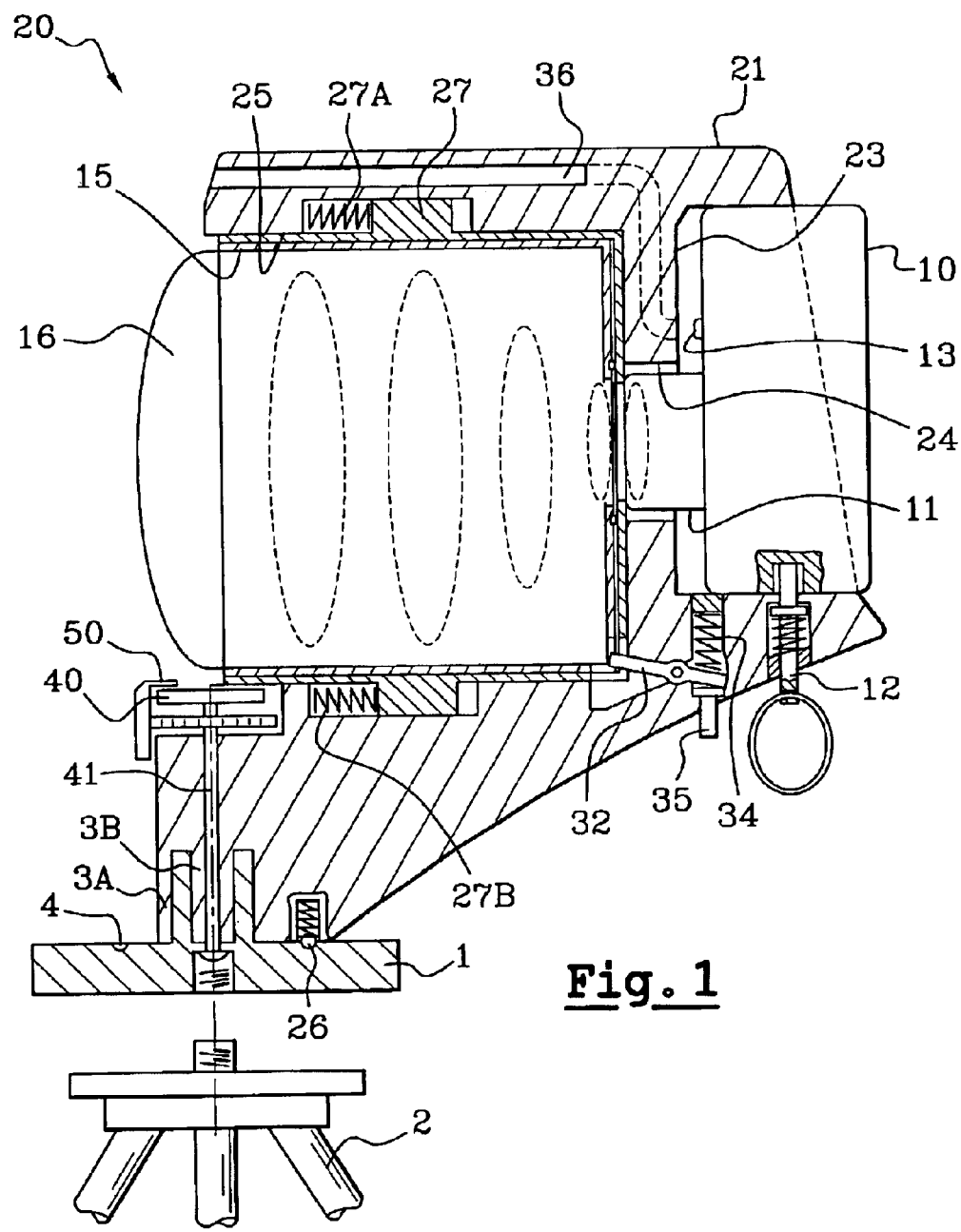
FIG. 1 is a cross-section of an embodiment of a camera support device according to the present invention.
Figure 2:
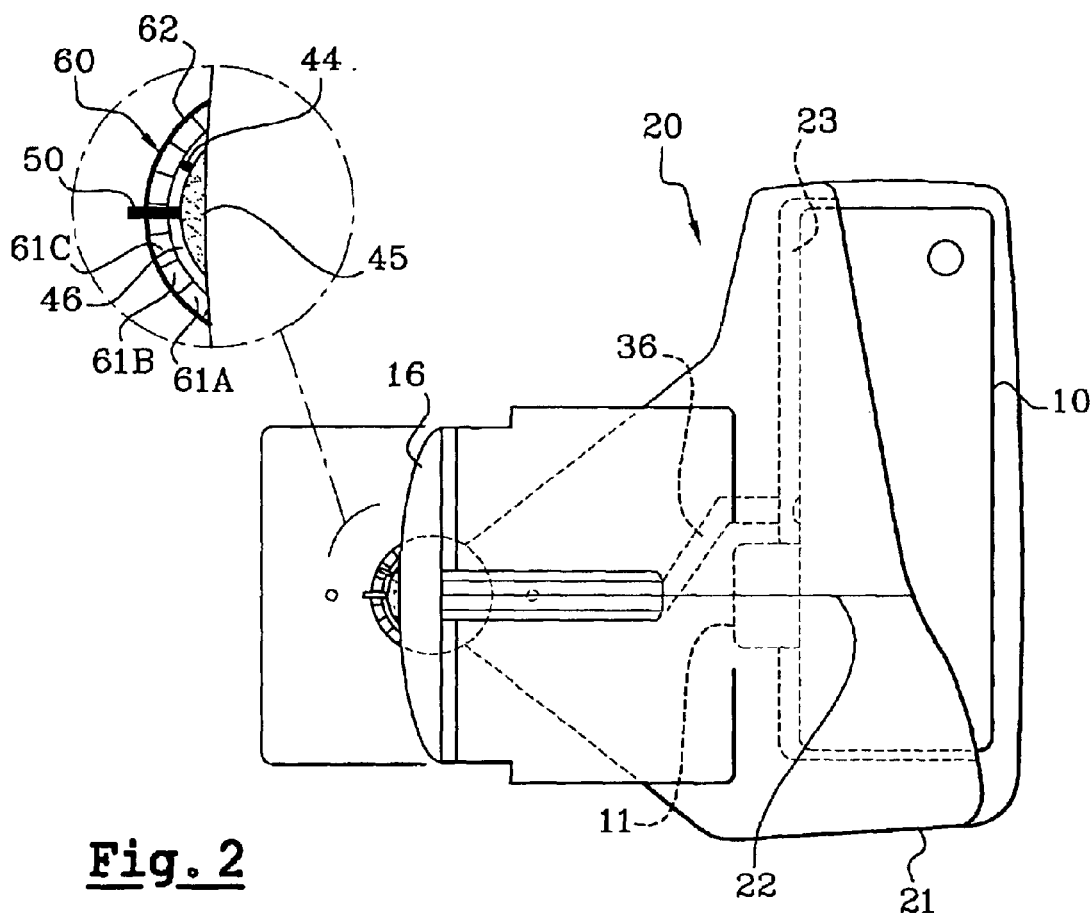
FIG. 2 is a top view of the support device in FIG. 1.
Figure 3:
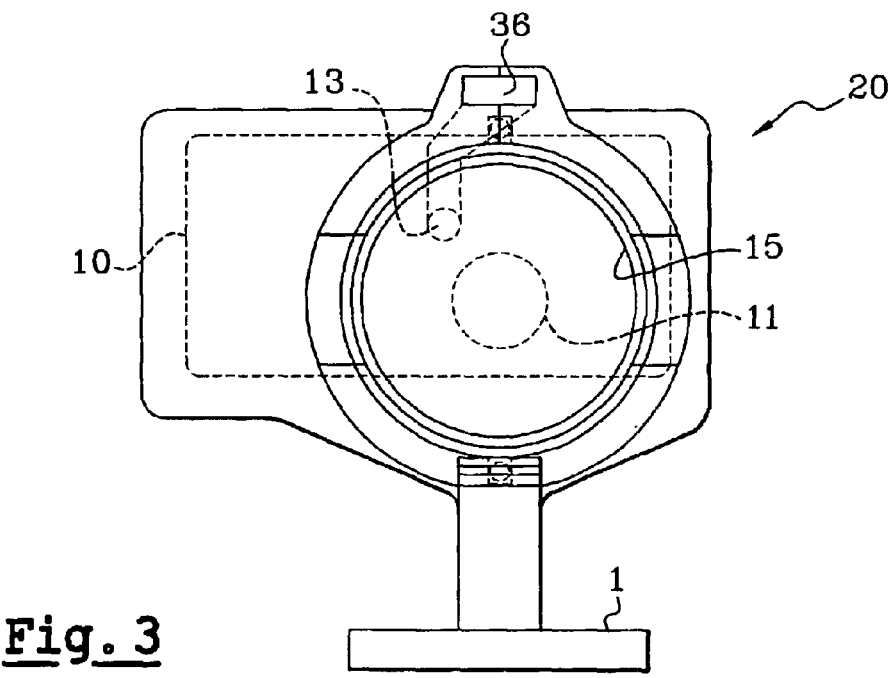
FIG. 3 is a front view of the support device in FIG. 1.
Figure 4:
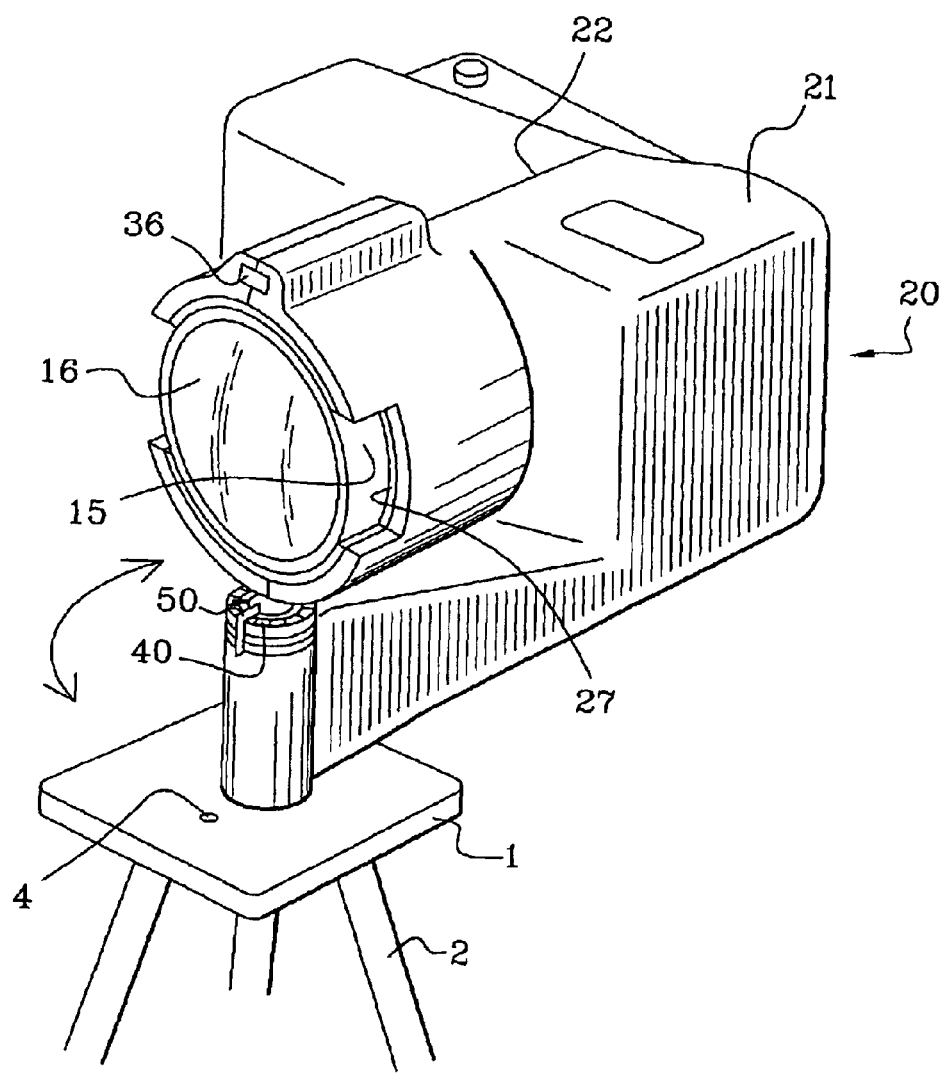
FIG. 4 is a perspective view of the support device in FIG. 1.

The support device 20 comprises a body 21 rotatably mounted on a base 1 attached to a tripod 2. The body 21 is produced here by welding or gluing two shells in moulded plastic, the assembly line 22 of the two components appearing in FIG. 4. With reference to FIG. 1, the back of the body 21 has a housing 23 receiving here a compact digital camera 10, comprising an irremovable or "fixed" lens 11. At the front of the housing 23 there is a cylindrical cavity 24 receiving the lens 11 and opening onto another cylindrical cavity 25 of a greater diameter, that opens onto the front of the body 21. The camera 10 is locked into the housing 23 by means of a pin 12 screwed into an attachment orifice provided on the lower face of the camera 10, this orifice being classical in itself. The rotation of the device 20 on the base I is performed by a tubular component 3A integral with the base 1 and oriented upwards, receiving a cylindrical part 3B formed in the lower part of the body 21. The lower part of the body 21, which extends around the tubular component 3A, has one lower face substantially parallel to the base 1 fitted with a ball 26 captive mounted in a cavity. The ball 26 is pushed by a spring against the base 1. The ball 26 cooperates with a cavity 4 made in the base 1, the assembly forming a system for locking the body 21 in a determined angular position around the axis 3B. At least two cavities 4 are made in the base 1 on either side of the axis of rotation 3B to enable the body 21 to be locked in two angular positions shifted by 180°, with a view to taking two complementary panoramic photographs allowing, after digitising and assembling the photographs, a 360° digital panoramic image to be obtained.

Further, the cylindrical cavity 25 made in the front part of the body 21 receives a component 27 allowing a lens 15 of the panoramic adapter type ("panoramic converter lens") to be attached. This panoramic adapter 15 is provided to cooperate with the fixed lens 11 of the camera to form an optical group offering a camera angle on the order of 360°, preferably substantially higher than 360° and on the order of 363°. As it can be seen from the various fig.s, the attachment component 27 holds the panoramic adapter 15 opposite the fixed lens 11 and in line with the lens 11 without the need to attach it to the camera.

Figure 5:
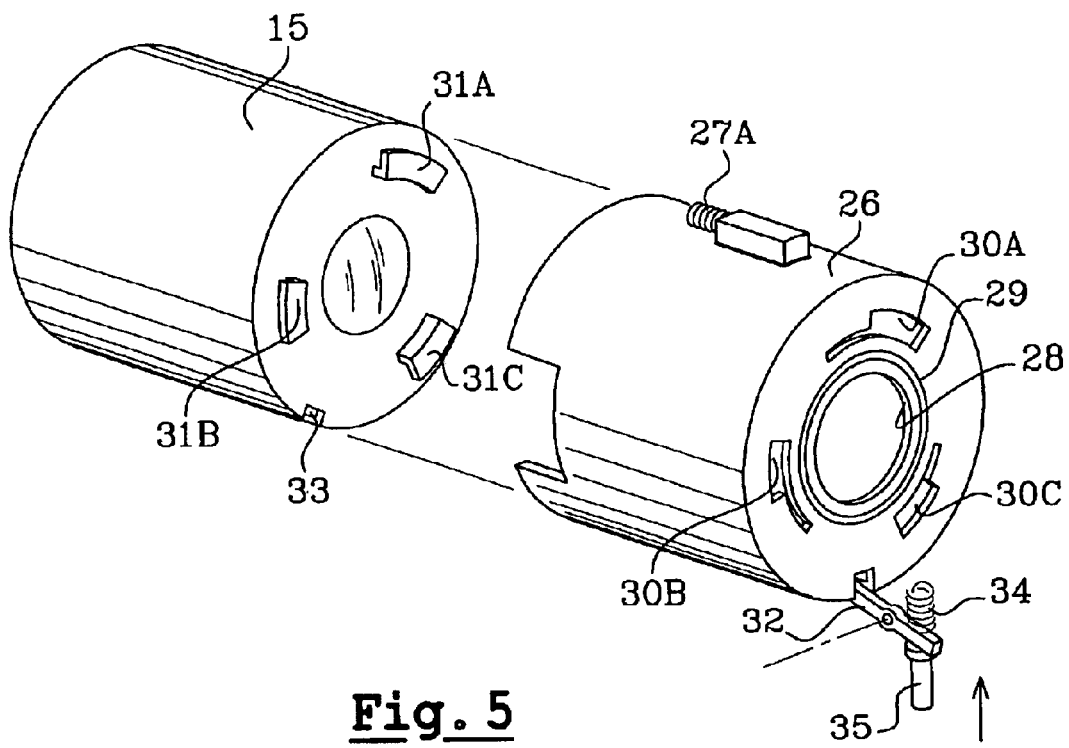
FIG. 5 is an exploded view of one element of the support device in FIG. 1.

The attachment component 27 is slidably mounted into the cavity 25 and is pushed by springs 27A, 27B towards the fixed lens 11. As best seen in the exploded view in FIG. 5, the component 27 is here a hollow cylinder forming a socket into which the panoramic adapter 15, of corresponding shape, is arranged. The bottom of the component 27, located opposite the front lens of the fixed lens 11, has a wall in which an orifice 28 has been made ensuring that light passes between the panoramic adapter 15 and the fixed lens 11. The orifice 28 is surrounded by an annular component 29 of a small diameter, in felt or rubber for example, attached to the back face of the wall. The annular component 29 comes into contact with the peripheral part of the fixed lens 10, which is made of plastic, and acts as a damper and a spacer.

Therefore, when the panoramic adapter 15 is engaged into the bottom of the component 27 and the component 27 is pressed against the lens 11 by the springs 27A, 27B, the back lens of the panoramic adapter 15 does not come into contact with the front lens of the lens 11, which avoids scratching the two lenses.

The component 27 and the panoramic adapter 15 have a universal-type locking system, here a bayonet system, enabling other types of adapters, such as a teleadapter lens (tele converter lens) for example to be arranged in the component 27. Therefore, it can be seen in FIG. 5 that the bottom of the component 27 has three apertures 30A, 30B, 30C provided to receive three components 31A, 31B, 31C forming hooks that are integral with the back face of the panoramic adapter 15, the locking working classically by inserting and rotating the panoramic adapter 15 into the component 27. The support device further comprises a component 32 forming a lever one end of which cooperates with a notch 33 made on one edge of the panoramic adapter 1, through a slot made on one edge of the component 27. In FIG. 1, it can be seen that the component 32 is held in a locking position by a spring 34 and can switch to a position for releasing the panoramic adapter 15 by pressing a button 35.

The body 21 of the support device also comprises a light guide 36 with an optical fibre, opening onto the front face of the body 21 and allowing front light to be guided to a light-sensitive cell 13 of the camera 10.

According to one optional but advantageous feature of the present invention, the nodal plane of the front lens 16 of the panoramic adapter 15 is naturally located in line with the axis of rotation 3B of the device when the adapter 15 is locked into the component 27 and the latter is abutted against the lens 11. As used herein, "nodal plane" means a plane comprising the nodal points of the lens, the alignment with the axis of rotation of which must be ensured to avoid parallax errors, as it is well known by those skilled in the art. In practice, this result is obtained by an arrangement of the axis of rotation 3B at the front of the body 21, taking into account, at the time the body 21 is designed, the length of the panoramic adapter 15 and the length of the fixed lens 11.

The result is that the support device 20 according to the present invention, combined with the panoramic adapter 15 and with a compact digital camera, can be used by inexperienced people to take panoramic photographs, without alignment adjustment or tests aiming to detect parallax errors. The result is also a low cost price of the support device according to the present invention, which does not have the expensive graduated mechanisms found on classical pan heads. Therefore, the assembly formed by the panoramic adapter and the support device can be marketed in the form of a kit at a low selling price, affordable by the majority of the public.

Further, the support device according to the present invention can be adapted to any type of compact digital camera, including compact cameras that are not intended to receive a panoramic adapter. The low cost price of the device according to the present invention allows a body 21 to be provided that is different for each type of compact camera present on the market, while keeping a panoramic adapter 15 common to all the embodiments.

It will be understood that various alternative embodiments of the support device that has just been described may be made that are within the understanding of those skilled in the art and that can relate to most of the special features of the embodiment that has just been described, while remaining within the scope of the present invention. In particular, one alternative embodiment allowing the cost price of the device to be reduced even further involves attaching the panoramic adapter 15 permanently onto the body 21, without providing the component 27. One embodiment exclusively dedicated to wide-angle photography can thus be provided. In this embodiment, the panoramic adapter is slidably mounted and is pushed by a spring system into a rear abutment position where it is opposite and in line with the fixed lens of the camera.

Furthermore, the abutment position of the panoramic adapter can be obtained in various ways, other than contact with the fixed lens, particularly by means of a fixed stop at the bottom of the housing receiving the panoramic adapter.

It will be noted here that certain compact digital cameras have fixed but motorized lenses, the term "fixed" here designating the irremovable nature of the lens. As such, motorized lenses are capable of moving forward when the focal distance is adjusted, providing an elastic means ensuring a flexible contact between the panoramic adapter and the fixed lens avoids any deterioration of the fixed lens or the adapter in the event of an unexpected displacement forwards of the fixed lens. On the other compact cameras, the motorization ensuring the adjustment of the focal distance is applied to the lens system which moves inside the fixed lens, the external length of which remains constant.

The support device 20 represented in FIGS. 1–4 has other features that will be described below. These additional features are in themselves independent from the previous ones and are therefore capable of being applied to other camera supports, particularly classical pan heads. These additional features are provided in relation with some aspects of the present invention that refer to processing a digital image, particularly a method for orienting digital panoramic images and a method for correcting the color that will be described subsequently.

b. Aspects of the Support Device Relating to Obtaining Oriented Panoramic Images Referring again to FIG. 1, it can be seen that the body 21 has, under the front lens 16 of the panoramic adapter, a region substantially set back located vertically relative to the axis of rotation 3B, forming a sort of recess where additional elements are arranged. These additional elements comprise a compass 40 and a tongue 50 attached to the end of a vertical rod 41 coaxial to the axis of rotation 3B, the rod 41 not being integral in rotation with the body 21. The rod 41, here screwed into the base 1, passes through the base 1 as well as the cylindrical axis 3B of the body 21 to reach the region located under the front lens 16.

Figure 7:
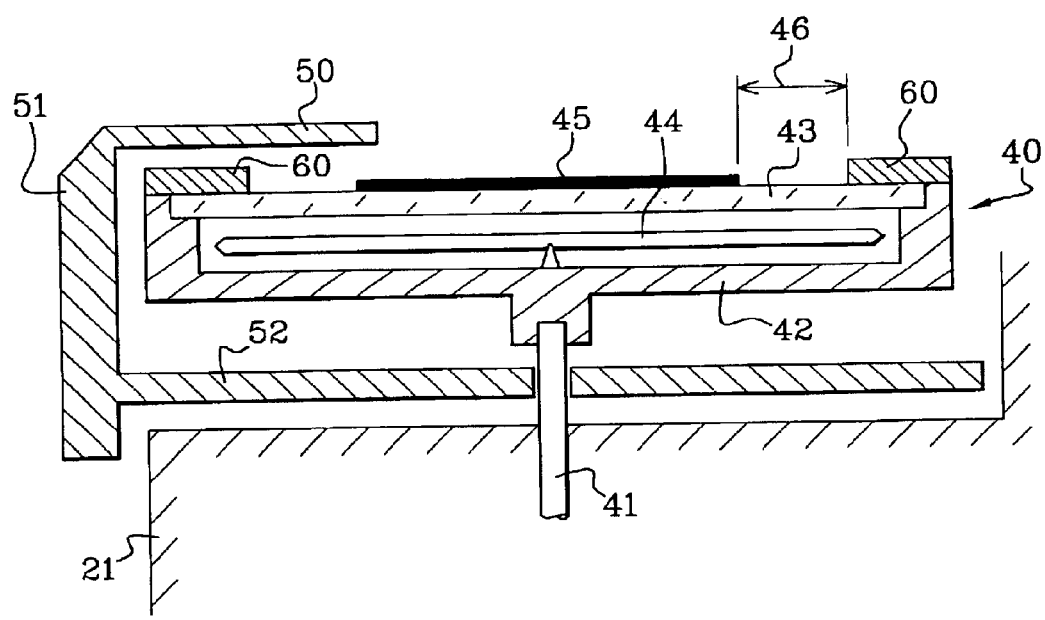
FIG. 7 is a cross-section of the compass and of the color-grading component.

These elements are represented in greater detail in FIG. 7. The compass 40 comprises a box 42 covered by glass 43 and comprising a magnetic needle 44. The tongue 50 is arranged horizontally and parallel to the glass 43, and extends over the compass. The tongue 50 is borne by an arm 51 that runs alongside the edge of the box 42. The lower part of the arm 51 is attached to a disk 52 arranged under the box 42 and rotatably mounted around the rod 41.

The bottom of the box 42 preferably has an artificial color that can be distinguished from the natural colors of an exposure, such as fluorescent yellow for example. One half of the needle 44, such as the north half for example, has a color that contrasts highly with the color of the face, such as red for example, while the other half of the needle is preferably of the same color as the face. The tongue 50 itself has a color that contrasts highly with the color of the face, while being different from that of the needle, such as blue for example. The needle 44 and the tongue 50 each constituting an orientation mark intended to be photographed during an exposure. Finally, the central part of the face is dark in color, preferably black, here obtained by gluing a disk of black paper 45 onto the glass 43. Thus, as it can be seen in FIG. 2, the face 46 of the compass seen from overhead looks like a colored ring, here a yellow ring, cut in the radial direction by a red line (north half of the needle 44) and by a green line (tongue 50).

Figure 8:
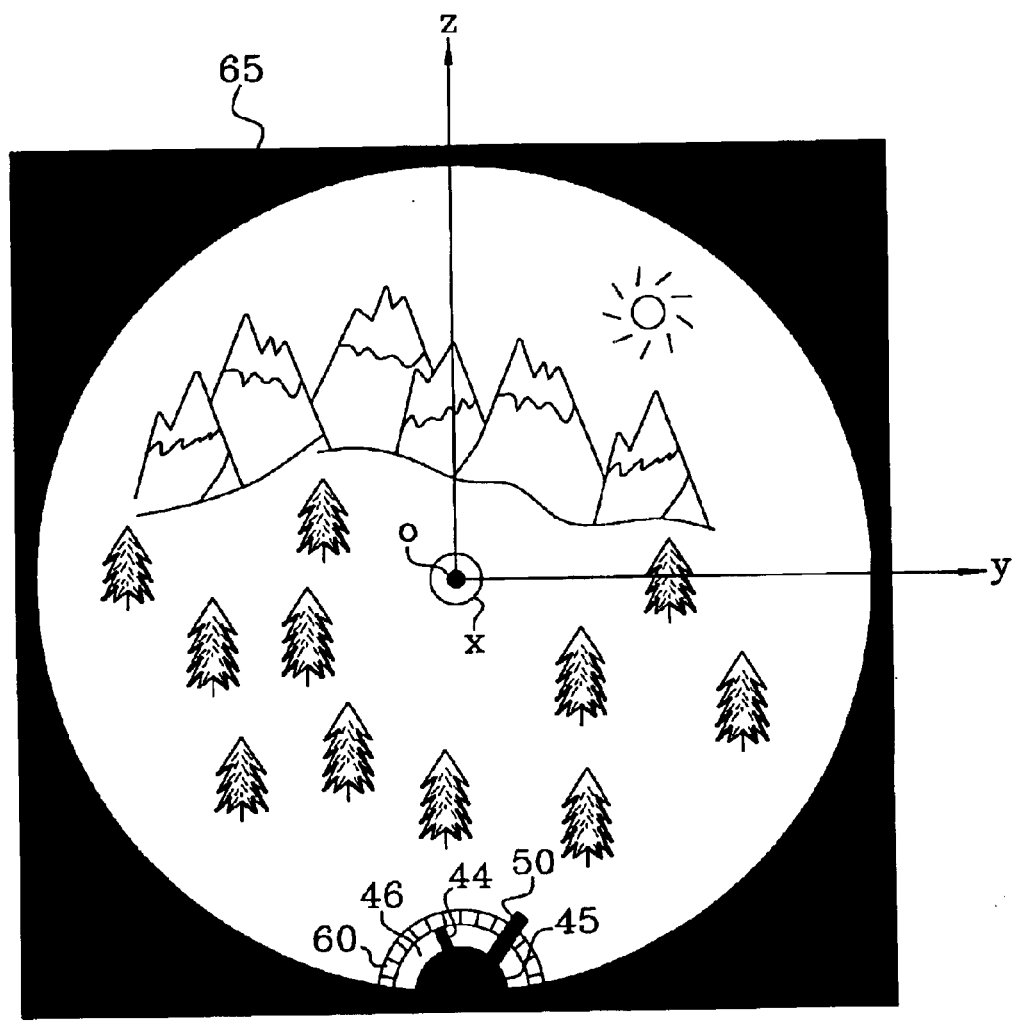
FIG. 8 is an example of a wide-angle photograph taken by means of a camera arranged on a support device according to the present invention.

FIG. 8 schematically represents a panoramic photograph 65 taken by means of the support device according to the present invention. The usable part of this photograph is classically circular in shape and the photograph has dark edges that will be removed subsequently when the image is digitized. As the face 46 of the compass is coaxial to the axis of rotation 3B and in line with the nodal plane of the front lens 16 of the panoramic adapter, one half of face appears in each panoramic photograph taken, whatever the angular position of the body relative to the base. Thus, on the lower edge of the photograph a yellow ring can be seen (face 46). The yellow ring is here cut in the radial direction by a red line (north half of the needle 44) and by a green line (tongue 50), which means that the photograph has been taken substantially in the direction of the north and/or that the user has not sought to conceal the tongue.

Figure 6:
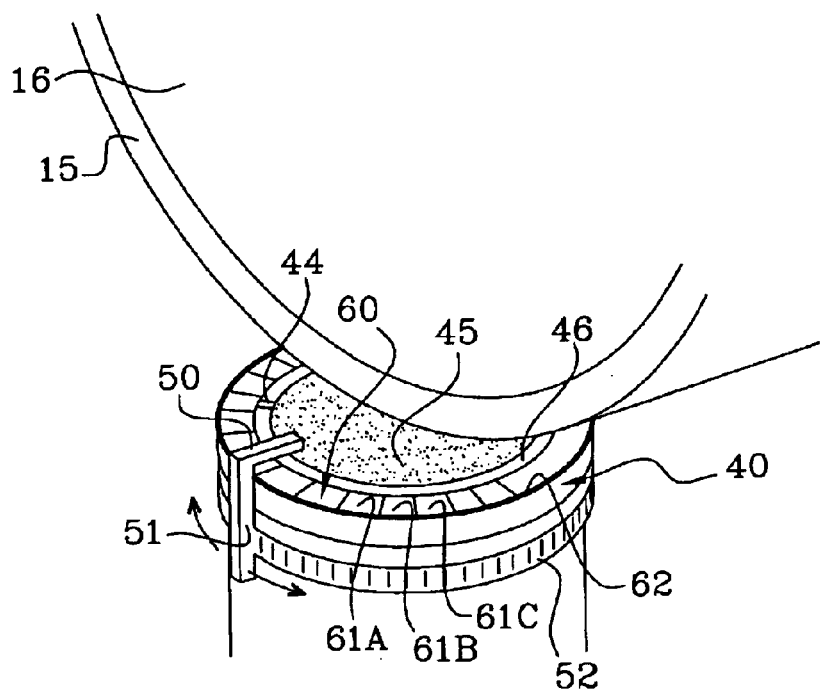
FIG. 6 is a close-up of the support device showing a compass and a color-grading component.

With reference to FIG. 6, the recommended "directions for use" of the device according to the present invention are as follows: the user chooses the view point from which he wishes to take two complementary photographs, takes a first photograph, rotates the camera by 180° and takes a second photograph. If the terrestrial magnetic field is present and the needle of the compass naturally orients itself to the North, the user must preferably turn the tongue 50 around its axis so that it does not appear in the photograph. If, on the contrary, the user is in a place where the terrestrial magnetic field is attenuated and does not correctly orient the needle of the compass, the user chooses an arbitrary direction and holds the tongue 50 in this direction upon each exposure and for each new group of two photographs, if he then wishes to produce a virtual visit of the place without losing the orientation thanks to a method described below.

c. Aspects of the Support Device Relating to Controlling the Color of a Panoramic Image Referring to FIG. 6, it can be seen that the region of the support device located beneath the front lens 16 also comprises a color-grading component 60. The grading component 60 is advantageously annular and coaxial to the axis of rotation 3B so that it appears in the exposures regardless of the angular position of the camera, as can be seen on the photograph in FIG. 8. The grading component 60 is here arranged on the periphery of the face 46 of the compass and is attached directly onto the glass 43, as can be seen on the cross-section in FIG. 7. The grading component is for example a ring made of plastic or paper glued onto the glass 43.

The grading component 60 here comprises a plurality of colored sectors 61A, 61B, 61C each having a determined primary color. These primary colors are preferably green, red and blue. They are preferably chosen unsaturated, and have for example an intensity of 50%. The following values can be chosen with reference to the PANTONE standard:

Sectors 61A: Red 50%, i.e., Magenta50+Yellow50
Sectors 61B: Green 50%, i.e., Cyan50+Yellow50
Sectors 61C: Blue 50%, i.e., Cyan50+Magenta50

The sectors 61A, 61B, 61C form sequences of primary colors that are repeated over the entire perimeter of the grading component 60, and therefore, show a series of Red Green Blue sequences.

In one alternative embodiment, the grading component 60 is a grey ring, of, for example, an average grey at 50% (Black50) which corresponds to a color comprising an equal proportion of Red 50%, Green 50% and blue 50%. The grading component may further comprise, between the sequences of three primary colors, zones of black or white or sequences of black and white, or even sequences of black, white and grey. Furthermore, the presence of a grey 18% (Black 18) can be provided to possibly correct the luminance during a step of correcting the color described below.

Finally, the grading component 60 preferably has a thin black strip on its periphery, forming a sort of black ring that surrounds the sequences of primary colors, the purpose of which will become apparent subsequently.

It will be understood that various alternatives and embodiments of the support device according to the present invention may be made that are within the scope of the present invention, particularly as far as the shape and the arrangement of the compass, the structure of the compass, the shape and the arrangement of the color-grading component, its structure and the arrangement of the colors on the grading component are concerned.

Furthermore, although the device that has just been described has been initially designed to allow a panoramic adapter to be used with compact cameras that do not have any means for mounting this panoramic lens, it must be noted that the support device according to the present invention can also be used with SLR cameras ("Single Lens Reflex"). This use of the support device with SLR cameras can be particularly justified by the fact that the support device comprises additional elements such as the compass, the orientation tongue, the color-grading component, which may be of interest to owners of these SLR cameras, who are generally photography professionals. The purpose of these additional elements will become apparent through reading the following description of a method according to the present invention for orienting a panoramic image, and a method according to the present invention for correcting the color of a digital panoramic image.

II. Description of a Method for Obtaining an Oriented Digital Panoramic Image of Constant Color The flowchart in FIG. 9 describes the principal steps for obtaining an oriented digital panoramic image of constant color. On this flowchart an acquisition step S1, a digitisation step S2, a step S3 of forming a digital panoramic image, a step S4 of orienting the panoramic image and a step S5 of correcting the color of the panoramic image can be seen. The steps S1, S2 and S3 are classical in themselves and will only be succinctly described. The step S4 is performed in accordance with an orienting method according to the present invention. The step S5 is performed in accordance with a color correcting method according to the present invention. The steps S4 and S5 are independent from each other per se and could be inverted. However, in view of the arrangement of the grading component 60 in the support device 20 described above, it is advantageous here to perform the step S5 after the step S4 for reasons that will become apparent subsequently.

The step S1 involves taking at least two complementary panoramic photographs, by rotating the camera by a angle of 180° around an axis passing through the nodal plane of the panoramic lens. These steps are preferably performed with a digital camera, although a film camera can also be used if a scanner is available to digitize the photographs to thereby obtain photo files. The photo files delivered by the digital camera or by the scanner contain images, the image points of which are RGBA coded and are arranged in a two-dimensional table, "R" being the red pixel of the image point, "G" the green pixel, "B" the blue pixel, and "A" the Alpha parameter or transparency. The parameters R, G, B and A are generally coded on 8 bits and can therefore have an intensity ranging from 0 to 255.

The step S2 is a classical step of transferring the two photo files into a computer, generally a microcomputer, with possible storage in the hard drive. The microcomputer, under the control of an appropriate program, transfers the image points of the two photographs into a three-dimensional mathematical space. It will be considered here and in the description below that this mathematical space is a spherical coordinate system of axes Oxyz, which constitutes the preferred solution to implement the present invention. However, it will be understood by those skilled in the art that the present invention is not limited to this example and can also be implemented with other three-dimensional coordinate systems, such as cylindrical, Cartesian, and the like.

Thus, the image points RGBA of each photograph are transformed during the step S2 into image points coded RGBA($\Phi,\theta$), $\Phi$ being the latitude of a point calculated relative to the axis Ox in the vertical plane Oxz, and $\theta$ the longitude of a point calculated relative to the axis Ox in the horizontal plane Oxy. The angles $\Phi$ and $\theta$ are coded for example on 4 to 8 bytes (IEEE standard). By convention, the axis Ox is adjusted on the center of the photograph, as shown in FIG. 8. At the end of the step S3, there are therefore two images in hemispheres.

The step S3 of forming the total panoramic image involves assembling the two hemispheres by adding the image points that constitute them, and possibly merging the overlapping zones if the initial photographs were taken with a camera angle higher than 180°. Before the assembly, one of the two hemispheres is rotated 180° around the axis Oz by incrementing the angle $\theta$ of the image points by a value equal to $\pi$, such that one hemisphere comprises image points of a longitude between $-\pi/2$ and $\pi/2$ while the other hemisphere comprises image points of a longitude between $\pi/2$ and $3\pi/2$.

Classically, the step S3 may also comprise the creation of active zones in the panoramic image obtained, and hyperanchor links linking the active zones to other spherical panoramic images.

a. Orientation of the Panoramic Image (Step S4)

Figure 10A:
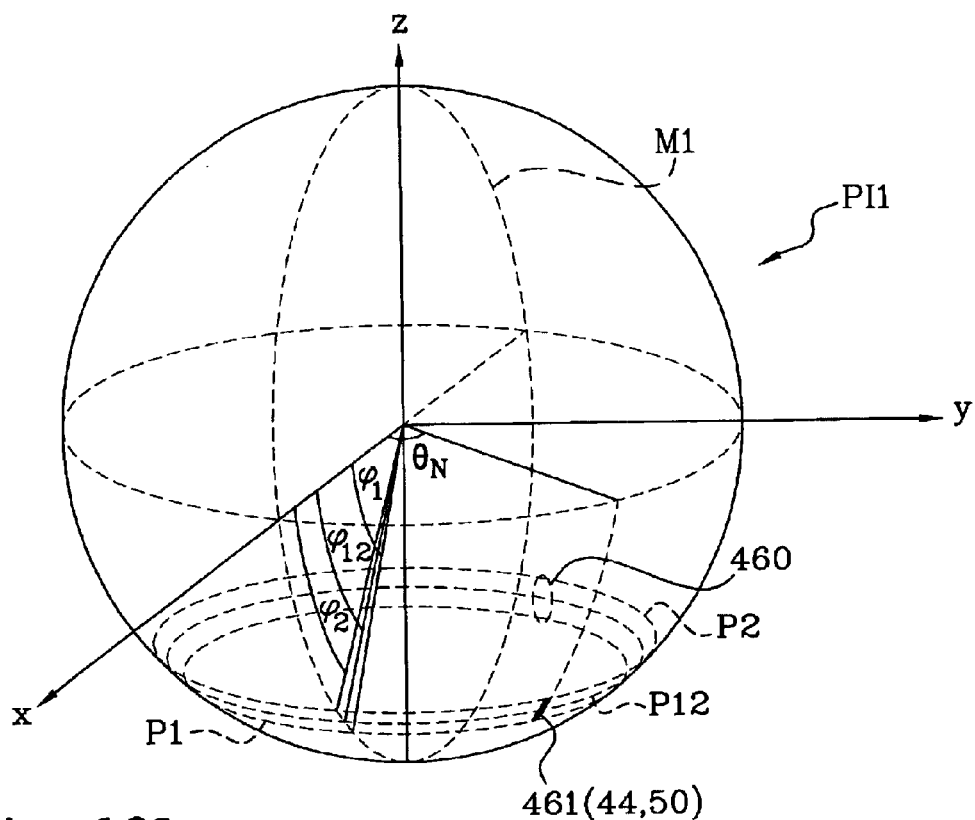

It will be assumed here that the two initial panoramic photographs have been taken by means of the support device described above fitted with its compass 40, or by means of a classical pan head fitted in accordance with the present invention with a compass coaxial to the axis of rotation of the nodal plane. In this case, as shown in FIG. 10A, the spherical image PI1 obtained comprises, in the proximity of its south pole, a face zone 460 which corresponds to the face 46 described above. The face zone 460 fills a sphere sector delimited by two parallels P1 and P2, corresponding to the annular shape of the face 46 transposed into the spherical space. The parallel P1 has a latitude $\Phi 1$ and the parallel P2 a latitude $\Phi 2$. In the sphere sector 460, which is for example fluorescent yellow in color as suggested above, there is an orientation mark 461 that must be detected and which has a longitude $\theta N$ in the horizontal plane Oxy. The determination of this angle $\theta N$ constitutes the essential object of the step S4 and of the orienting method according to the present invention.

In practice, the orientation mark 461 may correspond to the north half of the needle 44 of the compass and be red, or correspond to the tongue 50 and be green. If reference is made to the "instructions for use" above, the presence of the tongue means that the user has decided to use the tongue as orientation mark and not to conceal it. The detection of the tongue must therefore take priority over the detection of the needle of the compass.

The step S4 can be implemented by means of various image analysis algorithms the design of which is, per se, within the understanding of those skilled in the art. According to one aspect of the present invention, a very simple method is proposed comprising, firstly, a step of searching for the face zone 460, aiming to determine the angles Φ1 and Φ2, then a step of searching for the orientation mark 461 in the face zone 460.

a.1 Searching for the Face Zone

The angles Φ1 and Φ2 are detected by latitude scanning a sphere quarter, from the south pole Φ=−π/2) to the equator (Φ=0). The scanning is performed along a reference meridian of longitude θ0, such as the meridian M1 of longitude zero represented in FIG. 10A for example, which corresponds to the centre of the photograph. As the centre of the face of the compass has been chosen to be black, the detection of the angle Φ1 involves detecting a transition from the black to the fluorescent yellow and the detection of Φ2 involves detecting a transition from the fluorescent yellow to a color other than the fluorescent yellow. Therefore a "color" function is defined which consists for example of a weighted combination of the colors R, G, B of each image point. The weighting parameters are chosen according to the color of the face to obtain maximum detection sensitivity.

The algorithm 1 given in the APPENDIX is an integral part of the description and describes the implementation of this step of the method according to the present invention. The annotations in brackets are explanations and are not part of the algorithm. It will be noted that this algorithm makes provision for the case in which the face of the compass is not found, so that a software program executing the algorithm can deactivate the "image orientation" function itself if the user has taken photographs without a compass or other orientation means.

a.2. Searching for the Orientation Mark and Orienting the Image

The angles Φ1 and Φ2 being found, the orientation mark 461 remains to be found in the face zone comprised between the parallels P1 and P2 so as to determine the angle θN. This search is done here by keeping the angle Φ constant and by going round the sphere longitudinally, from −π to +π. The search is done on an intermediate parallel P12 located in the centre of the face zone between the parallels P1 and P2, of a latitude Φ12 equal to (Φ1+Φ2)/2. As indicated above, priority is given to detecting the tongue the presence of which means that the user has chosen not to use the compass.

The algorithm 2 given in the APPENDIX is an integral part of the description and describes the implementation of this second step of the orienting method according to the present invention. The sub-program called "attempt again" allows a provision to be made for the case in which the reference color read at the starting point of the scanning (here the angle point −π on the meridian M12) is the color of the orientation mark, which means that, by coincidence, the search has been started at the place where the tongue or the needle of the compass is located.

Once the angle θN has been found and logged, the orientation of the axes Ox and Oz of the digital image is known and an oriented image is therefore available.

In one alternative embodiment, all the image points of the sphere can then be readjusted by orienting the axis Ox on the mark. In this case, the angle θN becomes equal to 0 after readjustment. This alternative embodiment which requires additional calculation time is optional in practice, the logging of the angle θN being sufficient to give the panoramic image an orientation that is lacking in previous practices.

The purpose of this orientation of a digital panoramic image will become apparent subsequently, when a method for displaying panoramic images using the angle θN is described.

It will be understood by those skilled in the art that various alternatives and embodiments of the method that has just been described may be made, both as far as the steps of inserting an orientation mark into the initial image, and the method of detecting the orientation mark in the panoramic image obtained after digitising the initial image are concerned.

Thus, in one alternative embodiment, the needle and the face of the compass are replaced by a magnetic disk sensitive to the terrestrial magnetic field, having a determined color on its upper face and one or more graduations indicating one or more cardinal points.

If several graduations are provided for the inscription of different orientation marks in the initial image, these graduations can also be coded by their shape rather than by their color, for example by a number of parallel black lines that differ according to the graduation considered.

Generally speaking, any means of inscribing an orientation mark on an initial image intended to be digitized as described above can, according to the present invention, be provided.

b. Correction of the Color (Step S5)

Figure 10B:
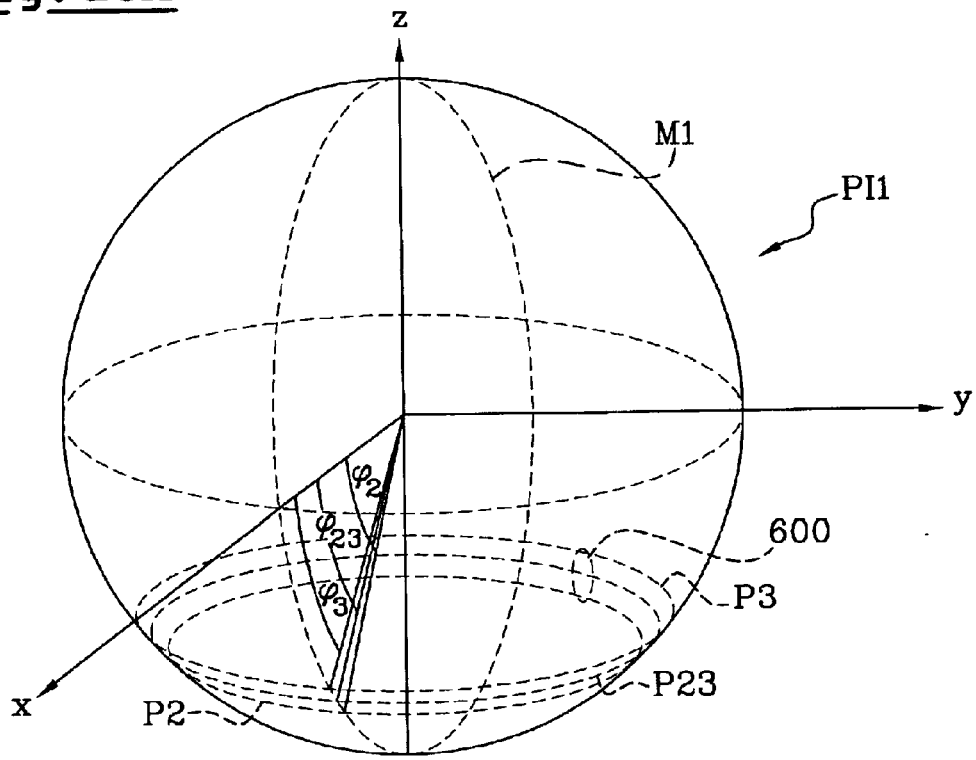

It will be assumed here that the two initial panoramic photographs have been taken by means of the support device described above fitted with the color-grading component 60, or by means of a classical pan head fitted in accordance with the present invention with a color-grading component coaxial to the axis of rotation of the nodal plane. In this case, as shown in FIG. 10B, the spherical image PI1 obtained comprises in the proximity of its south pole a color-grading zone 600 that corresponds to the grading component 60. The grading zone 600 fills a sphere sector delimited by the parallel P2, of latitude Φ2, and a parallel P3 of latitude Φ3. It should be noted that the angle Φ2 is known and has been determined during the step S4, the color-grading component here being arranged on the periphery of the face of the compass. Furthermore, the sphere sector 600 comprises sequences of primary colors R,G,B the original intensity on the grading component 60 of which is known and will be designated Iref. As the colors are coded on 8 bits, i.e. a color intensity scale ranging from 0 to 255, the original intensity Iref is here on the order of 127 since it was proposed above to provide semi-saturated primary colors (50%).

The color correcting method according to the present invention comprises:

detecting the color-grading zone 600 in the panoramic image, determining the gamma of the primary colors of the color-grading zone, performed with reference to the reference color intensity Iref allocated to each primary color, here the value 127, and a gamma correcting step applied to all or part of the image points of the digital panoramic image, performed by means of the gamma of the primary colors of the color-grading zone.

b.1. Detection of the Grading Zone

This step here involves determining the angles Φ2 and Φ3 of the parallels P2 and P3, and can be summarized here by a detection of the angle Φ3 since the angle Φ2 is known. The angle Φ3 is determined by a color transition detection algorithm based on the same principle as the algorithm 1, which will not be described in order to remain simple. As the grading component 60 has a thin black strip 62 (FIG. 6) on its periphery, the detection of the angle Φ3 involves detecting a fading of color by latitude scanning the sphere starting from the angle Φ2, such as along the meridian M1 for example.

b.2. Calculation of the Gamma and Gamma Correction

The step of calculating the gamma of the primary colors of the grading zone 600 and the gamma correcting step are performed by means of mathematical formulae that are classical in themselves. The method according to the present invention can be distinguished from previous practices by the fact that these steps are performed by means of a color reference common to all the photographs. The color correction performed is therefore constant from one panoramic image to the other, such that the variations in color observed in previous practices are removed by the method according to the present invention.

To calculate the gamma, first, the mean value "r", "g", "b" of the primary colors of the grading zone is calculated. Indeed, account must be taken of the variations in lighting on the various parts of the grading component at the time the initial photographs are taken. Furthermore, as the conditions of exposure differ depending on whether one is facing or turning one's back to the sun and, for photographs taken inside, according to the sources of light present, a calculation of the average intensity of the primary colors over the entire grading zone would be quite inaccurate. The sphere is therefore divided into several sectors longitudinally and the color correction is performed sector by sector, by calculating, in each sector, the mean value of the primary colors, calculating the gamma of the primary colors and correcting the gamma.

In an approximation sufficient to obtain a satisfactory and homogenous color correction, the sphere is divided into two hemispheres each corresponding to one of the initial panoramic photographs.

The algorithm 3 given in the APPENDIX is an integral part of the description and describes the implementation of the method according to the present invention with a sectoring of the image limited to two hemispheres. The grading zone 600 (FIG. 10B) is read along a parallel P23 located half way between the parallels P2 and P3 and having a latitude Φ23 equal to (Φ2+Φ3)/2.

The application of this algorithm to various panoramic images allows the color of all the images to be harmonized, the desired result thus being achieved.

It will be understood by those skilled in the art that various alternatives and embodiments of the method that has just been described may be made, both as far as the method used to insert a color-grading zone into the initial image and the steps of detecting the grading zone and correcting the color are concerned.

Generally speaking, any means for inserting a color-grading zone into an initial image intended to be transformed into a digital panoramic image, according to the present invention, can be provided.

Finally, although, to remain simple, a reference color intensity Iref was chosen above that is identical for each color, it goes without saying that it results from the formulae given in the algorithm 3 described in the APPENDIX that a determined intensity Iref(R), Iref(G), Iref(B) can be chosen for each primary color R, G, B.

III. Description of a Method for Displaying an Oriented Image According to the Present Invention a. General Principles of the Method According to the Present Invention As set forth in the preamble, the disadvantage of classical virtual visit methods is that the initial sector of the panoramic image displayed on the screen is frozen, the "initial image sector" being the image sector presented on the screen when the observer enters the image. To overcome this problem, it is necessary in previous practices to provide a complex chaining of the panoramic images requiring, in most cases, an accurate topography of the places.

Because of the orientation method described above, oriented panoramic images are available in which the angle θN between the orientation mark and the axis Ox is known. This angle is determined for each panoramic image processed, such that the various images processed have a common orientation reference. According to the present invention, this common orientation reference is used during a virtual visit to dynamically define, at the time of entering a panoramic image, an orientation that is not frozen as in previous practices but which depends on the "viewing direction" position of the observer at the time the latter leaves the previous image.

Figure 11A:
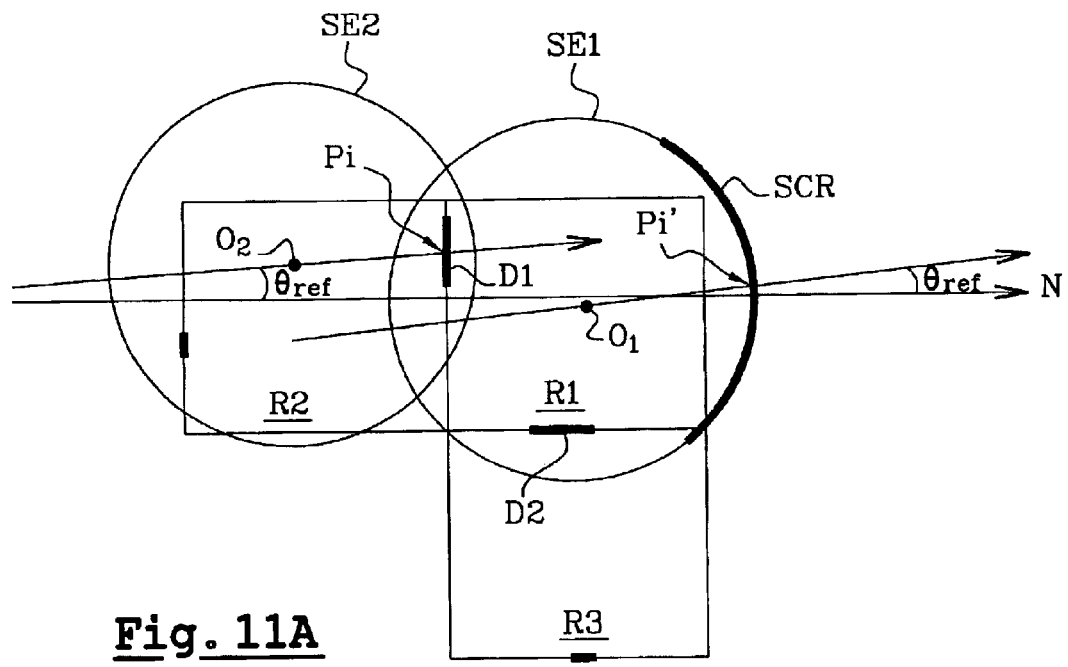
Figure 11B:
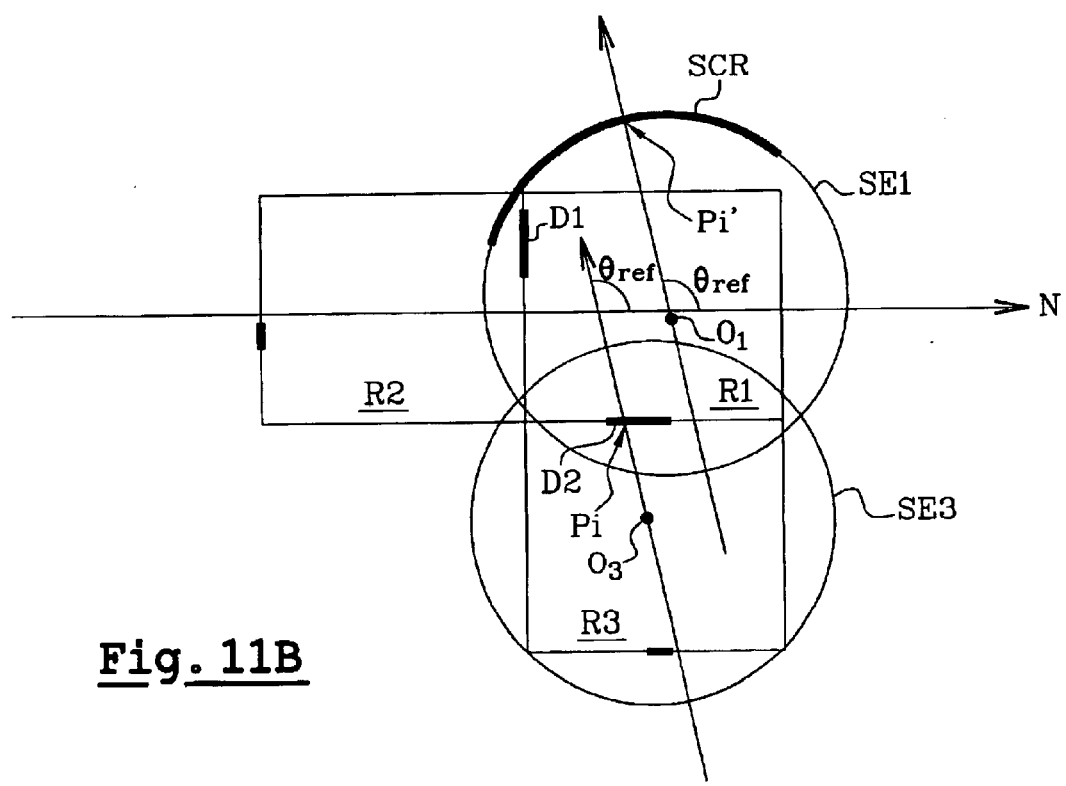

The method according to the present invention will be better understood with reference to FIGS. 11A and 11B, which represent two examples of entering a panoramic image SE1 from two different panoramic images SE2 and SE3. It will be considered here as an example that the panoramic image SE1 represents a room R1 adjoining a room R2 and adjoining a room R3. The room R2 is represented by the panoramic image SE2 and the room R3 represented by the panoramic image SE3. The rooms R1 and R2 are adjoined by a door D1 and the rooms R1 and R3 are adjoined by a door D2. The panoramic images SE1, SE2, SE3 are represented flat in the horizontal plane, in the form of circles. In a region corresponding (after projection onto the circle) to the door D1, the image SE2 comprises an active zone associated with a hyper-anchor link linking it to the image SE1 (and vice versa). In a region corresponding to the door D2, the image SE3 comprises an active zone associated with a hyper-anchor link linking it to the image SE1 (and vice versa).

It will now be considered with reference to FIG. 11A that the observer is "in" the image SE2 and clicks, by means of a screen pointer, on the active zone corresponding to the door D1. The next image displayed is therefore the image SE1. According to the present invention, a reference angle θref that represents the angle between the "viewing direction" of the observer and the orientation mark is determined in the image SE2. The "viewing direction" of the observer is the axis passing through the centre O2 of the image SE2 and the image point Pi of the active zone that has been selected by the observer to switch to the next image. The angle θref is given by the following relation:

$$\theta ref = \theta pi + \theta N2 \qquad (1)$$

in which θN2 is the angle between the axis Ox of the image SE2 and the orientation mark, for example the North N, and θpi is the longitude of the point Pi the coordinates including Φpi and Θpi.

According to the present invention, an angle θpi' is then calculated according to the following relation:

$$\theta pi' = \theta ref - \theta N1 \qquad (2)$$

in which θN1 is the angle between the axis Ox of the image SE1 and the orientation mark N. The angle found θpi' defines in the image SE1 a set of points of the same orientation.

An angle Φ0 of arbitrary value is then chosen, such as the angle zero for example, which defines with the angle θpi' and a point Pi' with coordinates Φ0, θpi' in the image SE1.

When the image SE1 is displayed on the screen (the screen being referenced SCR and marked by a thick line on the circle SE1), the initial sector presented on the screen is a sector of the image SE1 the central point of which is the point Pi'. The central point Pi' of the initial sector SCR corresponds to the central point of the screen since the initial sector fills the entire screen. The term "screen," are used herein, designates the display window of the sector of panoramic image. It is possible in practice for this window to only fill one part of the "actual" screen in front of the observer.

It can be seen that the point Pi' forms, with the centre O1 of the image SE1, an axis having an angle θref with the orientation mark, such that the "viewing direction" offered to the observer when he enters the image SE1 is identical to the "viewing direction" of the observer when he leaves the image SE2.

As the angle Φ0 of the central point Pi' is here equal to 0, the switching from one image to another resets the "viewing direction" to the horizontal. In one alternative embodiment, the angle Φ0 is chosen equal to the angle Φpi of the point Pi of leaving the previous image, such that the observer enters the image SE1 with an angle of observation that corresponds to the one he had in the image SE2, relative to the vertical plane.

In one alternative embodiment, an angular sector centred on the angle θpi' and delimited by two values θpi'−θ1/2 and θpi'+θ1/2 is defined, the angle "θ1" corresponding to the view offered by the screen in the horizontal plane. The set of points having an angle θ belonging to this angular sector is then displayed on the screen, by defining as before an angle Φ0 of penetration into the vertical plane and a corresponding sector comprised between Φ0−Φ1/2 and Φ0+Φ1/2, where "Φ1" the viewing angle offered by the screen in the vertical plane.

FIG. 11B shows an entry into the image SE1 from the image SE3 and shows that the method according to the present invention automatically modifies the initial sector displayed on the screen. Here, the "viewing direction" in the horizontal plane is the axis (O3 Pi) determined by the centre O3 of the image SE3 and a point Pi selected by the screen pointer on the active zone (here belonging to the door D2). As a result, the angle θref is different from its previous value and the image sector SCR presented on the screen is oriented to the West while it was substantially oriented to the North in the example in FIG. 11A.

It will be understood that various alternative embodiments of the method according to the present invention may be made. In the description above, the choice was made by convention to enter an image keeping the "viewing direction" of the observer. Various other methods of dynamically determining the initial sector can be provided while remaining within the scope of the present invention, including using the orientation mark as reference means to determine the initial sector.

b. Implementing the Method

Figure 12:
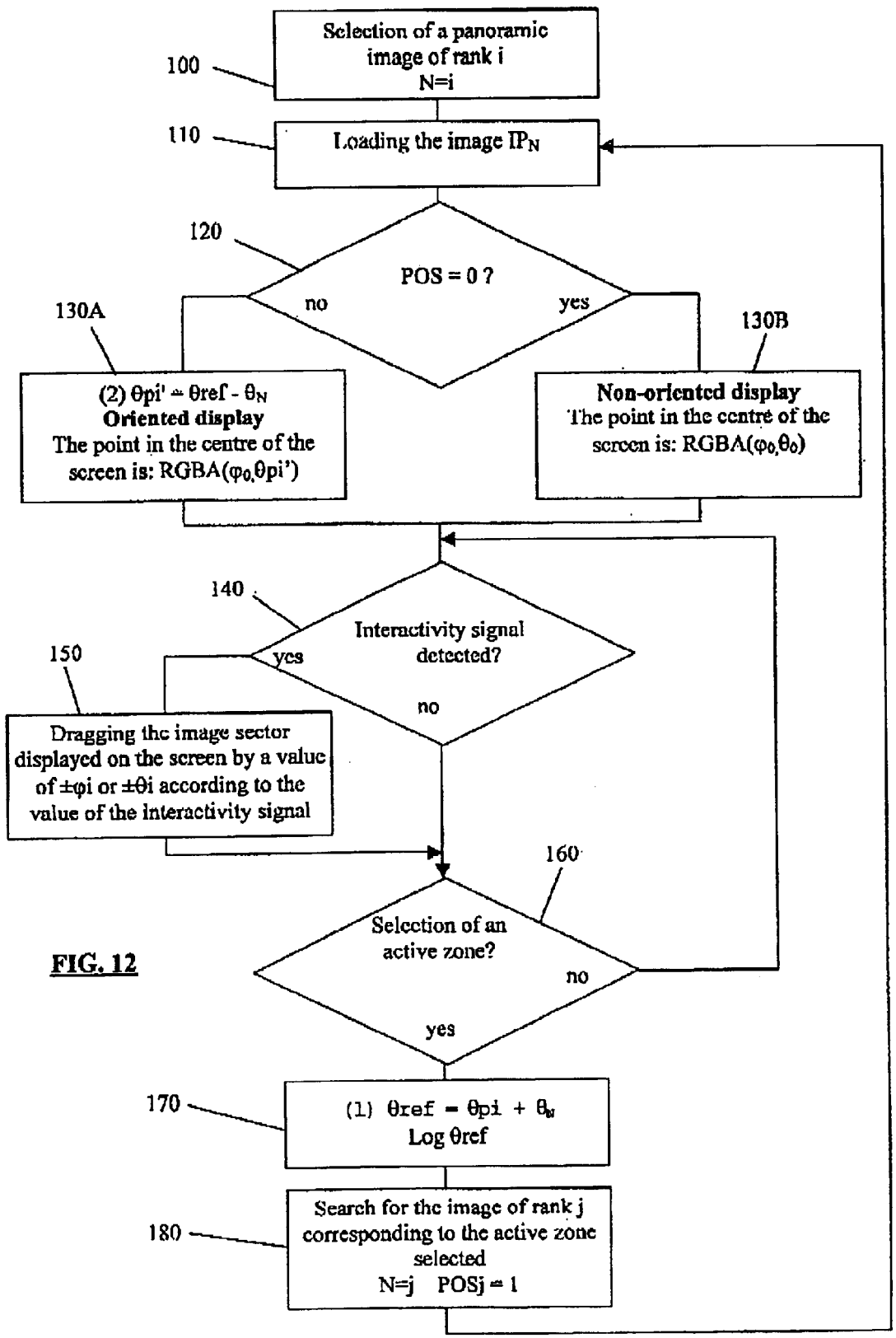
FIG. 12 is a flowchart describing an embodiment of the display method according to the present invention.

FIG. 12 is a flowchart describing the principal steps of a virtual visit method according to the present invention. Following the example of the orienting and color correcting methods described above, this method is performed by a computer or a microcomputer to which a program is provided comprising image processing algorithms, this program being for example recorded on a CD-ROM or downloadable on the Internet.

The virtual visit starts during a step 100 by the selection of a first panoramic image IPN of rank N=i, that is loaded into a buffer memory of the microcomputer during a step 110. This first image can be imposed on the observer or be chosen by the same. During a step 120, the microcomputer tests a flag "POSi" which tells it if a "viewing direction" angle θref has been defined for this image. If the flag POSi is equal to 1, the microcomputer proceeds with an oriented display of the image during a step 130A. If the flag POS is equal to 0, the microcomputer proceeds with a non-oriented display of the image during a step 130B.

The oriented display of the image in the step 130A first of all involves calculating the angle θpi' of the central point of the initial sector according to the reference angle θref and to the angle θN, in accordance with the relation (1) described above. Then, the microcomputer selects the image sector the central point of which has the coordinates (Φ0, θpi') and displays it on the screen.

The non-oriented display of the step 130B is performed in accordance with previous practices, the central point of the initial sector being a point of coordinates Φ0, θ0 the angle θ0, which is arbitrary.

After the step 130A or 130B for determining the point of entry into the panoramic image, the microcomputer remains within an interactivity management loop that is in itself classical, comprising steps 140, 150 and 160, which enables the observer to move the image upwards, downwards, to the left or to the right by means of a screen cursor or his keyboard. The observer's actions generate an interactivity signal that determines the displacement of the image in the observation window.

Therefore, during the step 140, the microcomputer determines whether the interactivity signal is present. If the interactivity signal is present, the microcomputer switches to the step 150 in which it drags the image into the screen according to the sign and/or to the value of the interactivity signal, and then goes onto the step 160 in which it determines whether an active zone has been selected or not. If the interactivity signal is not present, the microcomputer goes directly to the test step 160. After the test step 160, and if no active zone is selected, the microcomputer comes back to the step 140.

The loop 140–160 or 140–150–160 is broken when an active zone is selected. The microcomputer then switches to a step 170 where the reference angle θref is calculated in accordance with the relation (1) described above, the angle θref corresponding to the "viewing direction" of the observer, and then logs the angle θref.

During a step 180, the microcomputer determines the image of rank j that is designated by the hyper-anchor link associated to the active zone selected, puts the flag POSj of the image of rank j to 1 and comes back to the step 100 to load the image IPN=j. As the flag POS has been put to 1 before the loading of the image, the initial sector of the new image is displayed in an oriented manner during the step 130A.

c. Application of the Present Invention to Video-Surveillance

The display method that has just been described, and the image orienting method on which it is based, are also applicable of applications in fields other than digital photography.

Figure 13:
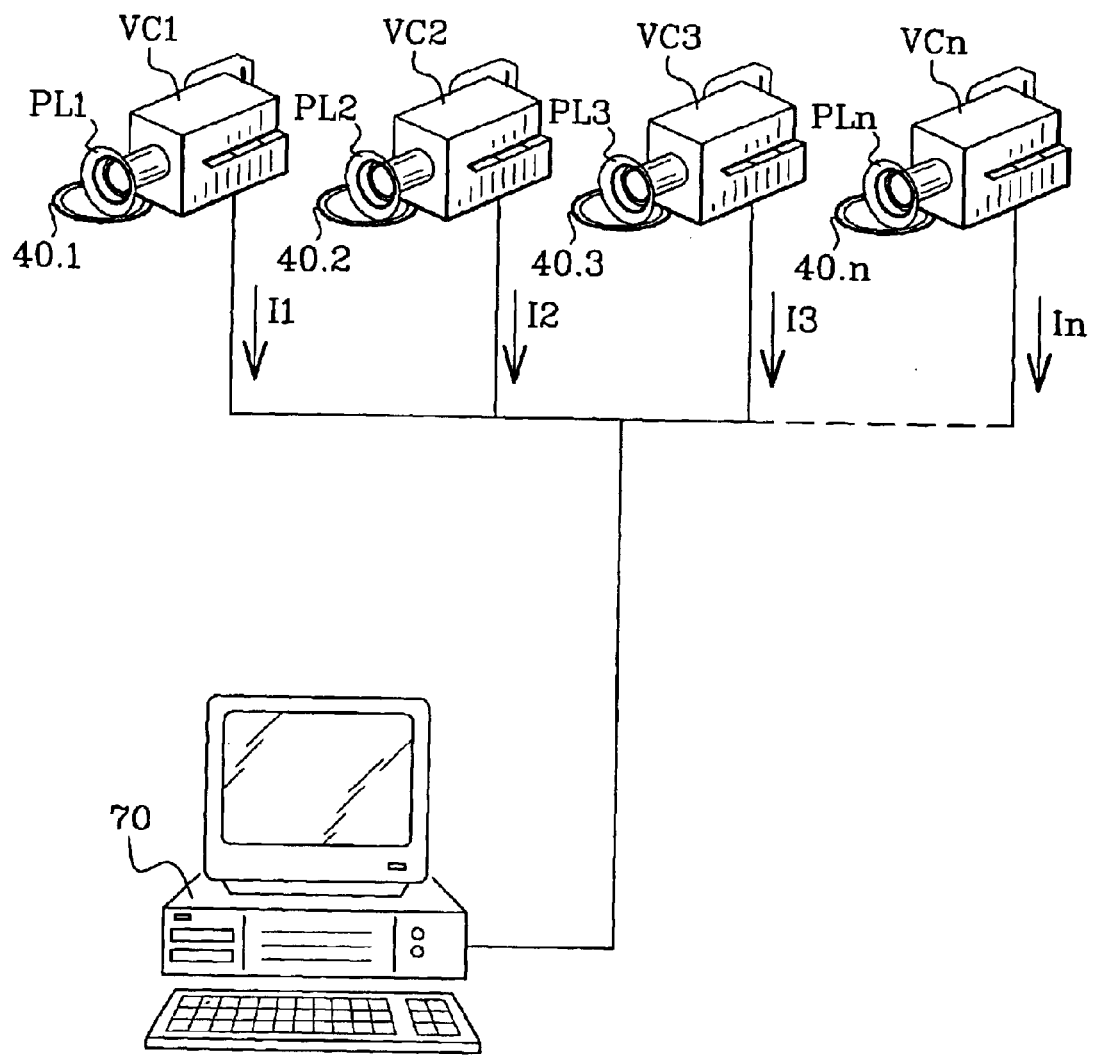
FIG. 13 represents a video surveillance system and shows an application of the present invention.

As an example, FIG. 13 represents a video-surveillance system comprising video cameras VC1, VC2, VC3, . . . VCn fitted with digital image sensors of CCD type. The cameras are linked to a central computer 70 arranged in a surveillance centre and having at least one screen.

It is noted here that the disadvantage of classical video-surveillance systems is that the various cameras must be mounted on remote-controlled motorized axes, so as to expand the field of surveillance and to be able to scan the various corners of a place to be kept under surveillance.

Here, the video cameras VC1, VC2, VC3 . . . VCn are fitted with panoramic lenses PL1, PL2, PL3, . . . PLn offering an viewing angle preferably equal to or higher than 180°. The various images I1, I2, I3, . . . In delivered by the cameras are processed in real time by the central computer by applying the classical step of digitization S2 (FIG. 9) by transfer into a three-dimensional coordinate system. The images are presented on the screen either simultaneously, or by selecting a camera out of the n-1 cameras available.

The advantage of this video-surveillance method is that it enables the place to be scanned by simply dragging the image sector presented on the screen. This method is equivalent to the one that involves rotating a camera around an axis but has the advantage of saving considerably on means since the motorized axes of the cameras and the means for remotely controlling the motorized axes are no longer necessary. Furthermore, the maintenance operations of the camera equipment are considerably simplified.

According to the present invention, each camera is further fitted with an orientation means 40.1, 40.2, 40.3 . . . 40.n, such as a compass of the type described above for example, which is arranged in the shooting field of the wide-angle lenses PL1 to PLn. Each image received by the central computer 70 is oriented in real time in accordance with the step S4 described above, and the transitions from one image to the other are processed taking into account the angle θN in accordance with the method shown in FIG. 12.

In practice, the application of the method according to the present invention can here be limited to the transitions between two images delivered by two different cameras. In fact, the panoramic images delivered by the same camera, despite being constantly refreshed, keep the same orientation. However, the application of the method according to the present invention to the transition between two images provided by different cameras gives better quality of use and allows, for example, a person passing through several surveillance fields to be "followed," by changing from one camera to the other, without being disoriented. The method according to the present invention can also be implemented when the images delivered by the cameras are displayed simultaneously on one or on several screens, for example, to orient all the image sectors simultaneously and in the same direction.

In this video-surveillance system, the panoramic lenses of the cameras can also be fitted with a color-grading component, and the color correcting step S5 described above can be applied to the panoramic images resulting from the video images delivered by the cameras.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

APPENDIX

That is an Integral Part of the Description

Algorithm 1:
Definitions:
function "color($\Phi$, $\theta$)"=f(R,G,B) at the point ($\Phi$, $\theta$)
$\epsilon$=constant>0 (scanning increment)
continue=TRUE
threshold S1=constant>0 (S1: detection threshold of a color variation)
$\theta 0$=constant ($\theta 0$ defines the search meridian M1)
$\theta = \theta 0$ (the search will be performed on the meridian M1)
Cref1=color($-\pi/2$, $\theta 0$) (Cref1 is the reference color to the south pole of the image (here black), on the meridian M1)
$\Phi = -\pi/2$
(search for $\Phi 1$ for $\Phi$ ranging from $-\pi/2$ to 0:)
While continue=TRUE do
c=color($\Phi$, $\theta 0$)
If difference between c and Cref1>S1
Then $\Phi 1 = \Phi$ and continue=FALSE
Else $\Phi = \Phi + \epsilon$
End if
If $\Phi > 0$ (scanning of $\Phi = \pi/2$ to 0 over, $\Phi 1$ not found)
Then go to<result 1>
End if
End While
(search for $\Phi 2$ for $\Phi$ ranging from $\Phi 1$ to 0:)
Cref2=color(($\Phi 1$, $\theta 0$) (reference color of the face in $\Phi 1$ (here yellow))
continue=TRUE
While continue=TRUE do
c=color($\Phi$,$\theta 0$)
If difference between c and p2>S1
Then $\Phi 2 = \Phi$ and continue=FALSE
Else $\Phi = \Phi + \epsilon$
End if
If $\Phi > 0$
Then go to<result 1>
End if
End while
Go to<result 2>
<result 1>
"Compass face not found"
Go to<end>
<result 2>
Logging of $\Phi 1$ and $\Phi 2$
<end>
***
Algorithm 2:
Definitions:
Function "color($\Phi$, $\theta$)"=f(R,G,B) at the point ($\Phi$, $\theta$))
$\epsilon$=constant>0
"tongue color"=constant
threshold S3=constant>0 (tongue or needle detection threshold)
threshold S4=constant>0 (tongue detection threshold)
$\theta 1 = -\pi$ (initial angle of choice of the reference color Cref)
$\theta = -\pi$ (initial angle of tongue or needle search)
$\Phi 12 = (\Phi 1 + \Phi 2)/2$ (parallel P12 of tongue or needle search)
<loop 1>(search for $\theta$ ranging from $-\pi$ to $+\pi$)
Cref=color($\Phi 12$, $\Phi 1$) (reference color at $\theta 1$)
c=color($\Phi 12$, $\theta$) (color tested)
if difference between c and Cref>S3
then go to<determination>(something has been found)
else $\theta = \theta + \epsilon$
if $\theta > \pi$
go to<attempt again>
else return to<loop 1>
<determination>(compass tongue or needle determination)
$\theta N = \theta$ (angle $\theta N$ of the orientation mark found)
if difference between color($\Phi 12$, $\theta N$) and "tongue color"<S4
then go to<result 2> else go to<result 3>
<attempt again>
θ1=θ1+ε (other choice of reference color)
if θ1>π go to<result 1>
else θ=−π and go to<loop 1>
<result 1>
"no orientation mark found, image not oriented"
<result 2>
"tongue found"
<result 3>
"compass needle found"
logging of θN
<end>
\*\*\*
Algorithm 3:
Definitions:
R(D(Φ, θ))=red component of the image point D(Φ, θ)
G(D(Φ, θ))=green component of the image point D(Φ, θ)
B(D(Φ, θ))=blue component of the image point D(Φ, θ)
Threshold S5=constant>0 (detection threshold of the red, the green or the blue)
Φ=Φ23=(Φ2+Φ3)/2 (reading the grading zone according to the parallel P23)
ε=constant>0 (increment of latitude reading θ)
Iref=127 (reference intensity of the primary colors on the grading component)
<start>
CALL FUNCTION <<HEMISPHERE PROCESSING>>, with:
start=−π/2
end=π/2
CALL FUNCTION <<HEMISPHERE PROCESSING>>, with:
start=π/2
end=3π/2
<end>
FUNCTION <<HEMISPHERE PROCESSING>>, (parameters=start, end)
θ=start (initial scanning angle of the grading zone)
r=0, g=0, b=0 ("r", "g" and "b" mean values of the red, the green and the blue on the grad zone)
NR=0, NG=0, NB=0 (NR, NG, NB: parameters for calculating the mean values r, g, b)
<reading of the grading zone>
If R(D(Φ, θ))>S5
go to<addition of the red points>
If G(D(Φ, θ))>S5
go to<addition of the green points>
If B(D(Φ, θ))>S5
go to<addition of the blue points>
<addition of the red points>
r=r+R(D(Φ, θ))
NR=NR+1
go to<increment>
<addition of the green points>
g=g+G(D(Φ, θ))
NG=NG+1
go to<increment>
<addition of the blue points>
b=b+B(D(Φ, θ))
NB=NB+1
go to<increment>
<increment>
θ=θ+ε
if θ>end
go to<calculate the average intensity>
else go to<read the grading zone>
<calculate the average intensity>
(calculation of the average intensity r, g, b of each primary color)
r=r/NR
g=g/NG
b=b/NB
go to<calculate the gamma>
<calculate the gamma>
(calculation of the gamma γr, γg, γb of each primary color)
γr=[log(r/255)]/[log(Iref/255)]
γg=[log(g/255)]/[log(Iref/255)]
γb=[log(b/255)]/[log(Iref/255)]
go to<color correction>
<color correction>
(gamma correction over the entire image sector)
for θ ranging from start to end
for γ ranging from −π/2 to +π/2
do:
R(D(Φ, θ))=255[R(D(Φ, θ))/255]γr
G(D(Φ, θ))=255[G(D(Φ, θ))/255]γv
B(D(Φ, θ))=255[B(D(Φ, θ))/255]γb
<END FUNCTION>

We claim:

1. A support device for a camera, comprising:
   means for attaching a camera, and
   means for rotating around an axis, including an orientation means arranged so that the orientation means appears in an exposure when a camera fitted with a panoramic lens is attached to the support device.

2. The support device according to claim 1, comprising a compass having a round-shaped face arranged concentrically to the axis of rotation of the support device.

3. The support device according to claim 1, comprising a compass including a face having an artificial color designed to be distinguished from the natural colors of an exposure during a computer image analysis aiming to find the location of the compass.

4. The support device according to claim 3, wherein the compass comprises an orientation mark of a determined color that contrasts highly with the color of the face, so as to be distinguished from the face during a computer image analysis aiming to find the location of the orientation mark.

5. The support device according to claim 4, wherein the orientation mark is a needle comprising a color that contrasts highly with the color of the face on a first north or south half and a color substantially identical to the color of the face on a second south or north half.

6. The support device according to claim 4, wherein the compass has a centre part in a dark color such that the face of the compass forms a colored ring the shape of which facilitates the detection of the face during a computer image analysis aiming to find the location of the face.

7. The support device according to claim 1, comprising a means for locating an arbitrary orientation, the position of which can be adjusted manually, and means for attaching the locating means arranged so that the locating means can be arranged in a visible position where it appears in an exposure when a panoramic lens is combined with the camera.

8. The support device according to claim 7, wherein the locating means is a tongue that extends over a compass face and is of a color that contrasts highly with the color of the face so as to facilitate the detection of the tongue during a computer image analysis aiming to find the location of the locating means.

9. The support device according to claim 7, wherein the locating means is rotatably mounted around an axis coaxial to the axis of rotation of the support device.

10. The support device according to claim 1, further comprising a color-grading component comprising at least three primary colors, and means for attaching the color-grading component arranged so that the color-grading component appears in an exposure when a camera fitted with a panoramic lens is arranged on the support device.

11. The support device according to claim 10, wherein the color-grading component is circular and concentric to the axis of rotation of the device.

12. The support device according to claim 1, further comprising means for attaching a camera fitted or capable of being fitted with a first lens, and means for attaching an adapter lens, particularly a panoramic adapter lens, arranged to hold the adapter lens in line with the first lens without the need to attach the adapter lens to the camera.

13. The support device according to claim 12, wherein the means for attaching the adapter lens comprise a mobile component and means for attaching the adapter lens to the mobile component, the mobile component being slidably mounted and pushed by an elastic means in a direction corresponding to the location of the front lens of the first lens.

14. The support device according to claim 12, comprising an optical guide to take a front light to a light-sensitive cell of the camera.

15. The support device according to claim 11, wherein the means for attaching the adapter lens are arranged to hold the adapter lens in a position such that the axis of rotation of the support device is located substantially in the nodal plane of the front lens of the adapter lens.

\* \* \* \* \*

UNITED STATES PATENT AND TRADEMARK OFFICE
CERTIFICATE OF CORRECTION

PATENT NO. : 6,885,817 B2
DATED : April 26, 2005
INVENTOR(S) : Artonne et al.

It is certified that error appears in the above-identified patent and that said Letters Patent is hereby corrected as shown below:

Column 21,
Line 41, "grad" should read -- grading --.

Signed and Sealed this

Nineteenth Day of July, 2005

JON W. DUDAS
*Director of the United States Patent and Trademark Office*